United States Patent
Hester et al.

(10) Patent No.: US 9,990,173 B2
(45) Date of Patent: Jun. 5, 2018

(54) MIXING OF SINGLE-BIT AND MULTI-BIT AUDIO SIGNALS FOR SIMULTANEOUS OUTPUT

(71) Applicant: Cirrus Logic International Semiconductor Ltd., Edinburgh (GB)

(72) Inventors: Dylan Alexander Hester, Austin, TX (US); Bala Vishnu Shankar Rao, Austin, TX (US); Tarun Soni, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 45 days.

(21) Appl. No.: 15/099,277

(22) Filed: Apr. 14, 2016

(65) Prior Publication Data

US 2017/0300290 A1    Oct. 19, 2017

(51) Int. Cl.
*H03G 3/00* (2006.01)
*G06F 3/16* (2006.01)
*H04H 60/04* (2008.01)

(52) U.S. Cl.
CPC .............. *G06F 3/165* (2013.01); *H04H 60/04* (2013.01)

(58) Field of Classification Search
CPC ................................ G06F 3/165; H04H 60/04
USPC ....................................................... 381/107
See application file for complete search history.

(56) References Cited

U.S. PATENT DOCUMENTS

| | | | |
|---|---|---|---|
| 5,598,353 A * | 1/1997 | Heyl | G06F 3/16 708/290 |
| 5,774,567 A | 6/1998 | Heyl | |
| 6,311,161 B1 | 10/2001 | Anderson et al. | |
| 6,438,434 B1 | 8/2002 | Kamiya | |
| 2002/0137478 A1* | 9/2002 | Masamura | H04M 1/0214 455/550.1 |
| 2003/0151535 A1* | 8/2003 | Melanson | G11B 20/10527 341/143 |
| 2005/0035891 A1* | 2/2005 | Pirjaberi | H03M 1/82 341/150 |
| 2008/0183755 A1* | 7/2008 | Zak | H04M 19/04 |
| 2016/0056781 A1* | 2/2016 | Rose | H03G 3/02 381/107 |

FOREIGN PATENT DOCUMENTS

WO          2014161091 A1    10/2014

* cited by examiner

*Primary Examiner* — Hemant Patel
(74) *Attorney, Agent, or Firm* — Norton Rose Fulbright US LLP (57) ABSTRACT

An audio processor may process dissimilarly formatted digital audio signals and produce an analog output for reproduction by a transducer, such as a speaker. The audio processor may be, for example, a digital-to-analog converter (DAC) with multiple digital inputs and a single analog output. The audio processor may also include other components, such as processing components, filters, equalizers, amplifiers, and the like. The audio processor may process audio, such as high fidelity DSD audio and lower fidelity PCM audio, and combine the differently formatted data into a single output. During processing, the audio processor may manipulate the different audio signals, such as by ducking a music playback to allow a notification sound to be played.

24 Claims, 6 Drawing Sheets

MIXING OF SINGLE-BIT AND MULTI-BIT AUDIO SIGNALS FOR SIMULTANEOUS OUTPUT

FIELD OF THE DISCLOSURE

The instant disclosure relates to audio circuitry. More specifically, portions of this disclosure relate to mixing two dissimilar audio signals.

BACKGROUND

Today, most information is stored and transmitted digitally. Thus, audio files being played back by a user are generally digitally-encoded audio information. At times, a device may be requested to play back two sounds simultaneously. Mixing of two audio signals as two analog signals is generally not difficult. Audio sources are generally converted from digital to analog signals and then the one or more audio signals is played back through a speaker. A key component of a circuit for reproducing audio information as sounds for a user is thus a digital-to-analog converter (DAC). Conventionally, audio information is converted to common analog signals regardless of the stored format of the audio information. The converted analog signals of multiple sources may then be mixed together, in analog processing, to obtain a speaker output from multiple sources.

Although computer circuitry can be either digital processing circuitry or analog processing circuitry, digital processing circuitry is often cheaper to design and manufacture than analog processing circuitry. Further, digital processing circuitry may consume less space and consume less power than equivalent analog processing circuitry. Thus, digital processing circuitry may be preferred over analog processing circuitry for certain devices, such as mobile devices. In these devices, processing of the audio information is generally performed in the digital domain, rather than the analog domain. In particular, the processing is performed prior to or as part of conversion of audio information to analog signals by the digital-to-analog converter (DAC).

Audio information of different digital formats is difficult to combine together for simultaneous output at a speaker using a single output path to the speaker through the digital-to-analog converter. One challenge is that the audio information may be stored as different resolution and different quality audio. For example, a high resolution audio digital-to-analog converter (DAC) that is designed for the portable and handset space is faced with an interesting problem. While the handset is playing back high-resolution audio streams, there may arise a need to use the audio playback channel to alert the consumer to incoming emails, text messages, or other notifications. There is a sizable library of short audio files that have been created for various types of notification, which are typically stored as WAV, AIFF, MP3, or other PCM-based file formats. The sample rates and bit depths of the PCM-based files are different from high fidelity ("Hi-Fi") audio files, which increases the difficulty of generating a single audio output from different audio streams.

Figure 1:
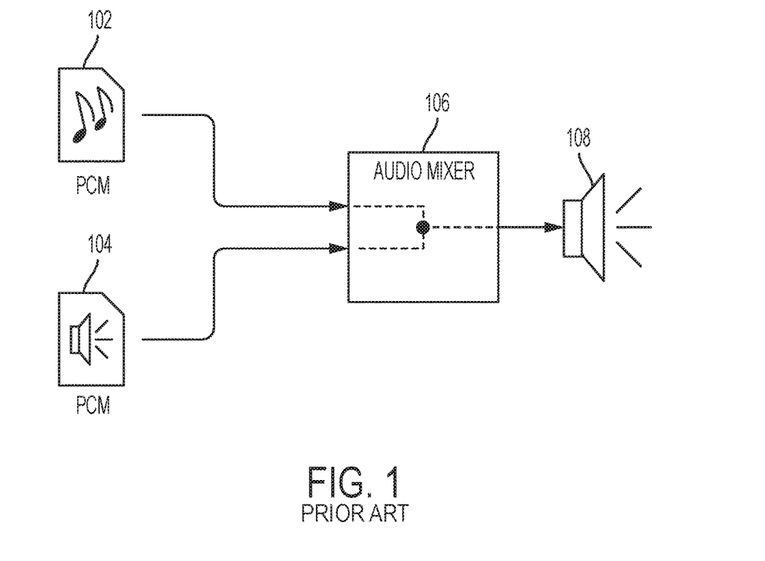
FIG. 1 is a block diagram illustrating an example of mixing of multiple PCM source files according to the prior art.

One conventional system for generation of an audio output from multiple sources is shown in FIG. 1. FIG. 1 is a block diagram illustrating an example of mixing of multiple PCM source files according to the prior art. A first PCM source 102, such as music, may be played back through an audio mixer 106 to generate audible sounds from a speaker 108. A second PCM source 104 may also be supplied to the audio mixer 106, which combines and scales signals from the sources 102 and 104. Because of the common digital format of the sources 102 and 104, the audio mixer 106 can combine information from the two sources in the digital domain with relatively little processing prior to conversion to an analog signal for output to speaker 108. However, recent interest in high-definition, or high-fidelity audio, which is generally stored in a different digital format than existing PCM files, has necessitated a change in operation of audio mixer 106 to support these Hi-Fi formats. Although conventional audio mixers are capable of processing these Hi-Fi formats, they do not support the mixing of dissimilarly formatted audio information, such as when one audio source is a pulse code modulation (PCM) source and one audio source is a pulse density modulation (PDM) source.

Shortcomings mentioned here are only representative and are included simply to highlight that a need exists for improved electrical components, particularly for audio processing employed in consumer-level devices, such as mobile phones. Embodiments described herein address certain shortcomings but not necessarily each and every one described here or known in the art.

SUMMARY

An audio processor may be configured to accept dissimilarly formatted digital audio signals and produce an analog output for reproduction by a transducer, such as a speaker. In certain embodiments, the dissimilarly formatted digital audio information may be combined in the digital domain for simultaneous output to the transducer by processing one or both of the digital audio signals to a format compatible for mixing. The audio processor may be, for example, a digital-to-analog converter (DAC) with multiple digital inputs and a single analog output. Although two inputs for dissimilarly formatted digital audio signals is described in embodiments herein, an audio processor or DAC for processing inputs may receive more than two inputs for mixing and/or more than two dissimilarly formatted digital audio signals. The additional signals may be processed in shared or parallel data paths within the audio processor. The audio processor may also include other components, such as processing components, filters, equalizers, amplifiers, and the like. The digital-to-analog converter (DAC) and other components of the audio processor may be implemented as an integrated circuit (IC) and manufactured as a single or multiple chips.

In one example implementation, the audio processor may receive dissimilarly formatted audio information as a one-bit wide data stream at one input and as a multi-bit wide data stream at another input. Additional inputs may also be provided for either one-bit or multi-bit wide data stream or other data formats. The one-bit wide data stream may be direct-stream digital (DSD) data, such as may be used for high quality or high fidelity music files. The multi-bit side data stream may be pulse-code modulation (PCM) data, such as may be used or standard quality music files or other audio sounds, such as notification sounds and ringtones, where the audio quality is less important. The audio processor may thus be configured to support mixing of high-fidelity (or "hi-fi") audio with lower fidelity audio to produce a speaker output that simultaneously reproduces the hi-fi music in high fidelity and a notification of email, text message, voice call, news alert, and/or other notification in lower fidelity.

According to one embodiment, a method may include receiving a first signal of a first format, which may include a one-bit wide data stream; receiving a second signal of a second format, which may include a multi-bit wide data stream; and/or mixing into a single output the first formatted one-bit wide data stream with the second formatted multi-bit wide data stream for simultaneous output of the first signal and the second signal to a digital-to-analog converter (DAC). In one embodiment, the high-fidelity signal may include direct stream digital (DSD) data and/or the low-fidelity signal may include pulse coded modulation (PCM) data.

In certain embodiments, the first signal may be processed in a first signal path before mixing the first signal with the second signal, wherein the first signal path processes a high-fidelity signal; the second signal may be processed in a second signal path before mixing the first signal with the second signal, wherein the second signal path processes a low-fidelity signal having a lower fidelity than the high-fidelity signal; the step of producing the single output may include ducking music during playback of a notification sound; mixing the one-bit wide data stream with the multi-bit wide data stream may include updating samples from the one-bit wide data stream and the multi-bit wide data stream at different rates, such as by asynchronously sampling the first signal and the second signal; the step of mixing the one-bit wide data stream with the multi-bit wide data stream may include interpolating the multi-bit wide data stream to a rate that is a ratiometric relation to a rate of the one-bit wide data stream; and/or the step of mixing the one-bit wide data stream with the multi-bit wide data stream may include converting the one-bit wide data stream to a second multi-bit wide data stream by filtering, and wherein the step of mixing comprises adjusting a volume of the second multi-bit wide data stream.

According to another embodiment, an apparatus may include a controller configured to perform steps including receiving a first signal comprising a one-bit wide data stream; receiving a second signal comprising a multi-bit wide data stream; and/or mixing into a single output the one-bit wide data stream with the multi-bit wide data stream for simultaneous output of the first signal and the second signal to a digital-to-analog converter (DAC). The controller may be any combination of circuitry that performs the described steps of receiving signals, mixing the signals, and/or other additional processing steps. For example, the controller may be part of an integrated circuit that includes a digital-to-analog converter (DAC) in a single chip. As another example, the controller may itself be a digital-to-analog converter (DAC) that includes circuitry for performing the described steps as part of the conversion process.

In certain embodiments, the controller may be configured to process the first signal in a first signal path before mixing the first signal with the second signal, wherein the first signal path processes a high-fidelity signal; to process the second signal in a second signal path before mixing the first signal with the second signal, wherein the second signal path processes a low-fidelity signal lower than the high-fidelity signal; to produce the single output by ducking Hi-Fi music playback during playback of a lower fidelity notification sound; and/or to mix the one-bit wide data stream with the multi-bit wide data stream by updating samples from the one-bit wide data stream and the multi-bit wide data stream at different rates, such as by asynchronously updating samples from the two signals.

According to another embodiment, an apparatus may include an audio processor having a first input node configured to receive a first signal comprising a one-bit wide data stream; a second input node configured to receive a second signal comprising a multi-bit wide data stream; a mixer configured to produce a single output combining the one-bit wide data stream with the multi-bit wide data stream; and/or an output node configured to output the single output.

In some embodiments, the apparatus may further include a pulse width modulation (PWM) modulator coupled to the output node of the audio processor; a digital-to-analog converter (DAC) coupled to the pulse width modulation (PWM) modulator and configured to drive an amplifier for reproducing audio data in the first signal and the second signal at a transducer; a first signal path coupled between the first input node and the mixer, wherein the first signal path processes a high-fidelity signal; a second signal path coupled between the second input node and the mixer, wherein the second signal path processes a low-fidelity signal having a fidelity lower than the high-fidelity signal; and/or an asynchronous sample rate converter (ASRC) coupled to the mixer, wherein the asynchronous sample rate converter (ASRC) is configured to control the mixer to update samples from the one-bit wide data stream and the multi-bit wide data stream at different rates. The asynchronous sample rate converter (ASRC) may be configured to control the mixer to asynchronously update samples from the one-bit wide data stream and the multi-bit wide data stream.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 2:
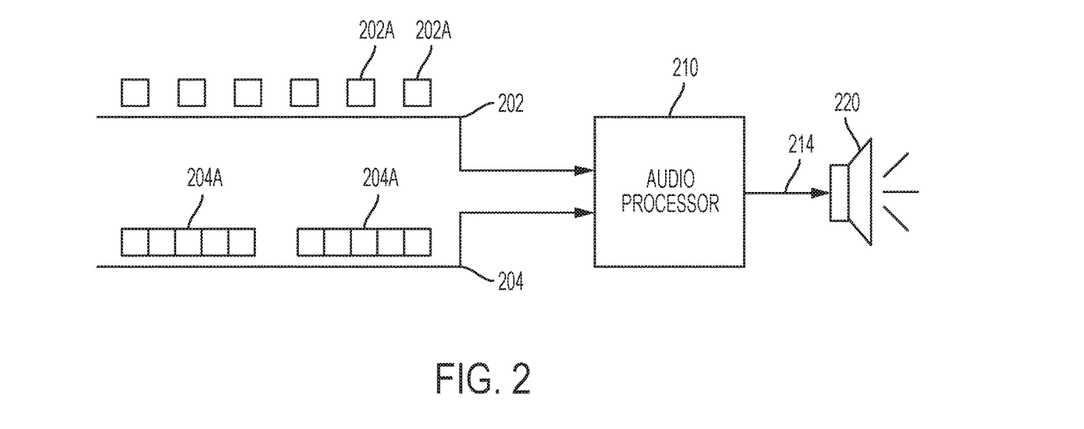
FIG. 2 is a block diagram illustrating an example of mixing of multiple dissimilar digital source files according to one embodiment of the disclosure.

In some embodiments, the two differently formatted digital audio data may be processed in two separate audio data paths. One data path may process PCM data, and a separate data path may process PDM data. The two streams may be combined at a mixer for output to other electronic components for further processing and/or for output to a transducer to reproduce the digital audio data. One example embodiment of such a processing system is shown in FIG. 2. FIG. 2 is a block diagram illustrating an example of mixing of multiple dissimilar digital source files according to one embodiment of the disclosure. An audio processor 210 may include two inputs, in which each input receives differently formatted data. For example, a first input 202 may receive single-bit wide data 202A, such as PDM data or DSD data, and a second input 204 may receive multi-bit wide data 204A, such as PCM data.

Figure 3:
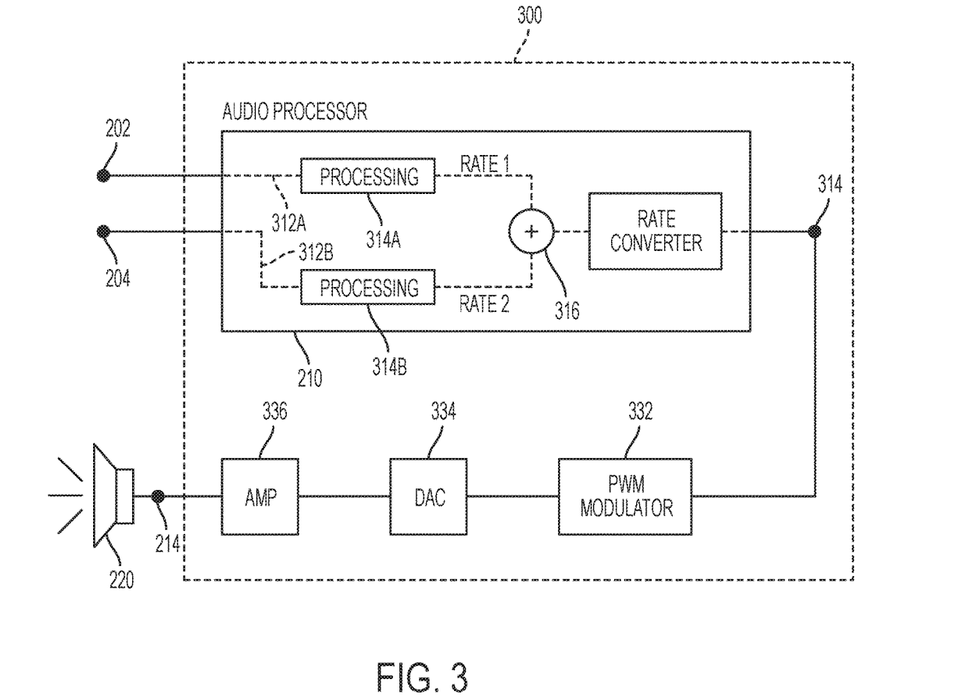
FIG. 3 is a block diagram illustrating an example system for mixing two digital signals of different formats according to one embodiment of the disclosure.

In one embodiment, the audio processor 210 may process the differently formatted data in two data paths. A block diagram showing one embodiment of an audio processor with separate data paths for the differently formatted data is shown in FIG. 3. FIG. 3 is a block diagram illustrating an example system for mixing two digital signals of different formats according to one embodiment of the disclosure. The audio processor 210 may process data received at inputs 202 and 204 in two separate audio data paths 312A and 312B, respectively, that are mixed within the audio processor 210 to produce a single audio output 214 that includes information from both of the received signal at inputs 202 and 204. Both data paths 312A and 312B within the audio processor 210 may be active at the same time, and the signals processed in each of the data paths 312A and 312B output simultaneously for reproduction by transducer 220. The audio processor 210 differs from conventional audio processors in one aspect because the audio processor 210 can process two differently formatted audio signals of different quality, mix the processed audio signals of different format and/or quality, and simultaneously output audio sounds contained in the processed audio signals for simultaneous reproduction at a transducer.

The data path 312B of the audio processor 210 may include electronic components 314B for processing, reformatting, equalizing, adjusting a volume, applying sound effects, or other processing on single-bit wide data streams. In one embodiment, the data path 312B may include an audio serial input port, which may accept I2S or TDM formatted data at a frequency Fs, where Fs may be 44.1 kHz with a bit depth of 16, 24 or 32 bits. The data path 312B may also include other components, such as a high pass filter, a digital volume control, and/or an interpolation filter. The interpolation filter may produce PCM-formatted audio output having a sample rate higher than the frequency Fs, such as higher than the frequency Fs by an integer multiple. For example, the interpolation filter may produce audio output having a frequency of 8*Fs, or 8 times the base PCM input rate.

The data path 312A of the audio processor 210 may include electronic components 314A for processing, reformatting, equalizing, adjusting a volume, applying sound effects, or other processing on multi-bit wide data streams. In one embodiment, the data path 312A may include an audio serial input port, which may accept data at a higher rate than the data path 312B, such as a rate of 64*Fs and a bit depth of 1-bit. The data path 312A may be capable of supporting multiple formats of data using the single-bit data width, such as bit serial, DSD, and DSD over PCM (DoP). The received 1-bit data may be processed in the data path 312A, which may include a comb SINC filter, a magnitude compensation filter, a high pass filter, and/or a digital volume control. The resulting output of the data path 312A may be a PCM formatted audio stream with a sample rate of 64*Fs. A mixer 316 may combine data from the first data path 314A and the second data path 314B. In some embodiments, the components in the data path 312A may be integrated in a single high-definition audio processor, such as a DSD Processor as described in other embodiments. In some embodiments, the audio processor 210 may be integrated with other components, such as pulse width modulation (PWM) modulator 332, a digital-to-analog converter (DAC) 334, and amplifier 336, as a single integrated circuit (IC) or chip 300. The chip 300 may also be referred to as a digital-to-analog converter (DAC) chip because the chip 300 receives digital signals at input nodes 202 and 204 and outputs an analog signal at output node 214.

Figure 4:
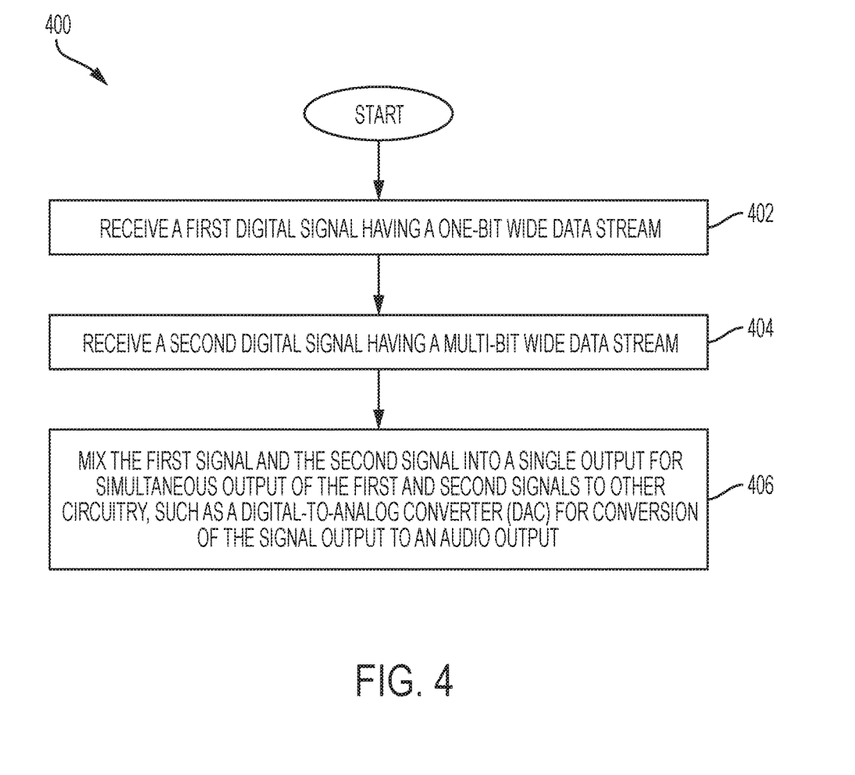
FIG. 4 is a flow chart illustrating an example method of mixing two digital signals of different formats for simultaneous output according to one embodiment of the disclosure.

A method for processing data of different formats by the audio processor 210 is shown in FIG. 4. FIG. 4 is a flow chart illustrating an example method of mixing two digital signals of different formats for simultaneous output according to one embodiment of the disclosure. A method 400 may include, at block 402, receiving a first digital signal having a one-bit wide data stream, such as DSD data, and, at block 404, receiving a second digital signal having a multi-bit wide data stream, such as PCM data. The reception at blocks 402 and 404 may occur simultaneously, such as when data is arriving at both inputs to the audio processor in a continuous manner even though the physical signals do not arrive at pin inputs or other physical coupling to the audio processor at the same time. In some embodiments, the first digital signal and the second digital signal may be received through a common input, such as by multiplexing two or more differently formatted data on a shared bus in an encapsulated grouping of data, such as a packet. The differently formatted data may be demuxed, or split, into two separate streams of data for separate data processing by the audio processor 210. As data is received in the first digital signal and the second digital signal, the data of the first signal and the second signal may be mixed, at block 406, for simultaneous output to other circuitry. Other circuitry may include, for example, a pulse width modulation (PWM) modulator, a digital-to-analog converter (DAC), and/or an amplifier for reproduction, by a transducer, of sounds encoded in the first and second digital signals as audio signals perceptible to a user.

Referring back to FIG. 3, single-bit wide data 202A and multi-bit wide data 204A may not be mixed together directly due to incompatibilities in the coding formats of the two input signals. Processing may be used on either of the data 202A and 204A within the audio processor 210 to prepare the data 202A and 204A for mixing with each other. For example, the data 202A and 204A may be converted to a common format and/or a common sample rate to support mixing of information contained in the data 202A and 204A. Although a common sample rate may be described in certain embodiments of the invention herein, the data 202A and 204A may be processed at different sample rates and combined through the use of an asynchronous sample rate converter (ASRC) or similar circuitry. That processing may be included as part of the mixing block 406 of FIG. 4 and electronic components included in the audio processor 210 of FIG. 2 to provide the processing functionality.

In some embodiments, further constraints may be placed on the processing performed in data paths 312A and 312B to meet certain design requirements. For example, to maintain quality of the high-fidelity audio a design requirement may be to avoid decimation processing within the data path 312A. In one embodiment, to make multi-bit wide data and single-bit wide data compatible for mixing without introducing artifacts in the audio band, the multi-bit wide data received at input 204 may be interpolated to a rate that is ratiometrically related to a rate of the single-bit wide data received at input 202. Although a ratiometrically related rate is described in one embodiment, the sample rates may remain unrelated and the samples later combined through an asynchronous sample rate converter (ASRC) or similar circuitry. Further, the single-bit wide data received at input 202 may be converted to multi-bit wide data for mathematical operations, such as multiplication and addition, used for volume control and mixing, respectively. When the inputs 202 and 204 receive PDM and PCM data, respectively, the audio processor 210 may process the inputs by interpolating the PCM data to a rate related to the PDM data rate and convert the PDM data to PCM-formatted data. As one example of the rate interpolation, the sample rate ratio of multi-bit wide data to single-bit wide data may be 1 to 8, such as when the sampling rates are 8*Fs and 64*Fs, respectively, for PDM data and PCM data. This additional processing may be performed prior to the mixing of the two signals.

Figure 5:
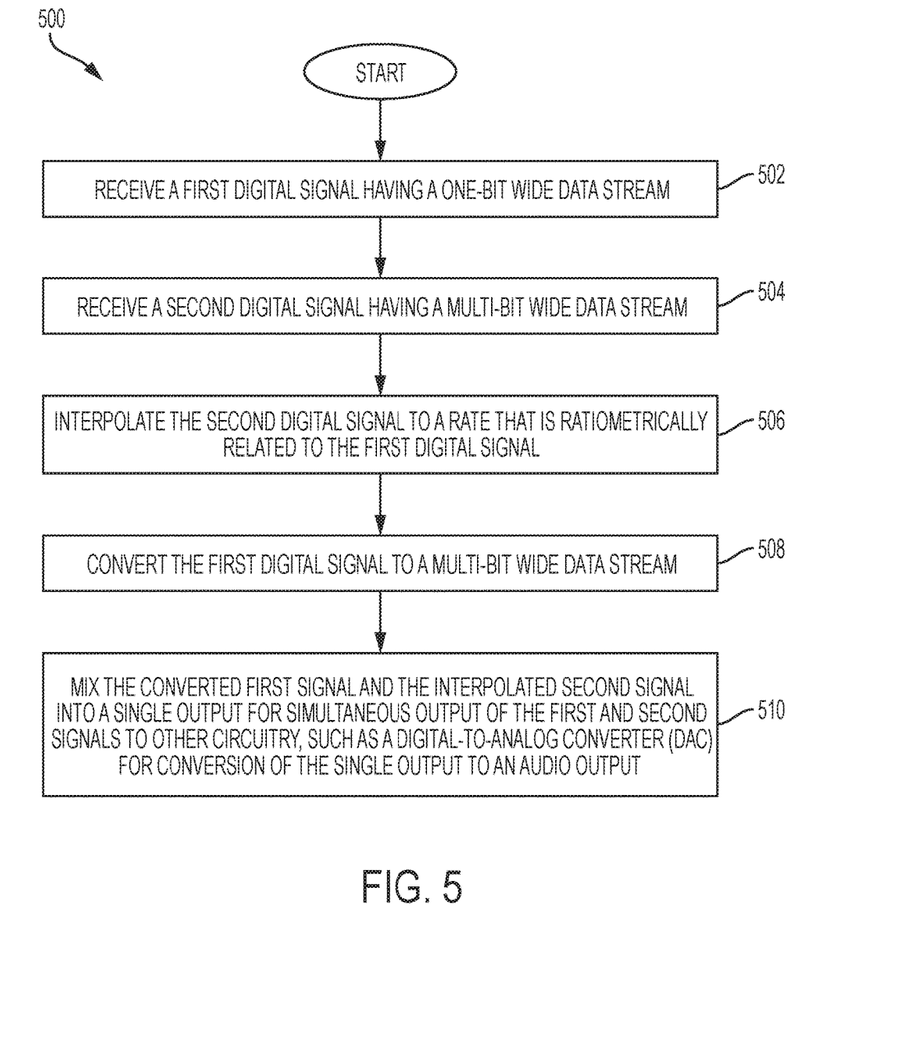
FIG. 5 is a flow chart illustrating an example method of mixing two digital signals of different formats for simultaneous output using interpolation and conversion of the digital signals in the digital domain according to one embodiment of the disclosure.

A method for processing data of different formats by the audio processor 210 with these constraints is shown in FIG. 5. FIG. 5 is a flow chart illustrating an example method of mixing two digital signals of different formats for simultaneous output using interpolation and conversion of the digital signals in the digital domain according to one embodiment of the disclosure. A method 500 may include receiving a first digital signal having a one-bit wide data stream at block 502 and receiving a second digital signal having a multi-bit wide data stream at block 504. At block 506, the second digital signal may be interpolated to a rate that is ratiometrically related to the first digital signal. At block 508, the first digital signal may be converted from a one-bit wide data stream to a multi-bit wide data stream. The converted first digital signal may have a rate similar to the rate of the original first digital signal, such that the rate of the interpolated second digital signal matches the rate of the converted first digital signal. Thus, the interpolation of block 506 and the conversion of block 508 result in two data streams of a similar format and rate, such that the two data streams may be mixed and further processing performed. At block 510, the interpolated second digital signal of block 506 may be mixed with the converted first digital signal of block 504. The mixed signal may produce a single output of information contained in the received first digital signal of block 502 and the received second digital signal of block 504. The mixed signal may be applied to a transducer to generate an audio output allowing a user to hear the content in both the first digital signal and the second digital signal.

For example, the user may hear both a notification sound received in the second digital signal of block 504 and high-fidelity music received in the first digital signal of block 502.

Further processing may be performed on the mixed signal to prepare the signal for driving a transducer. For example, referring back to FIG. 3, additional signal processing may be performed by a pulse width modulation (PWM) modulation 332, a digital-to-analog converter (DAC) 334, and an amplifier 336 coupled between an output 314 of audio processor 210 and the transducer 220.

Figure 6:
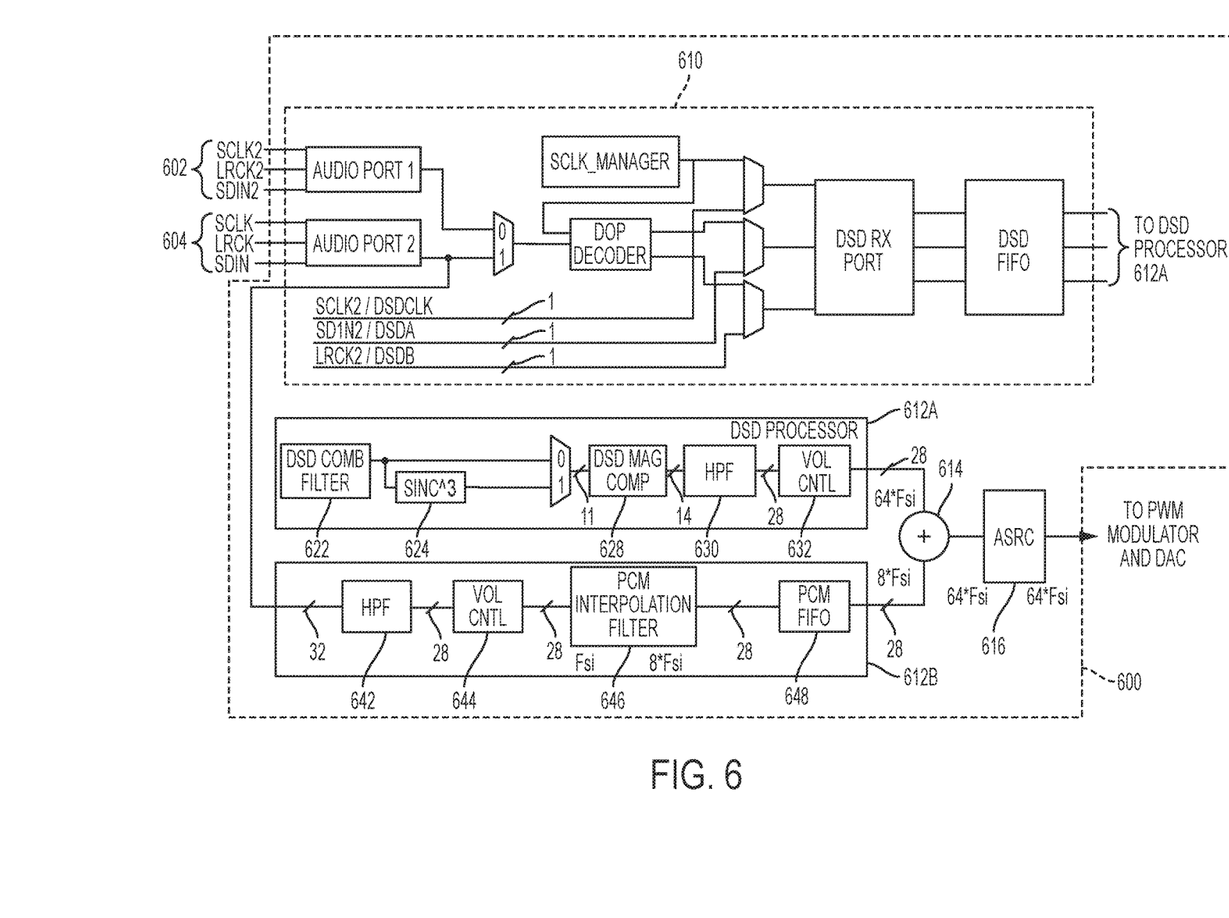
FIG. 6 is a block diagram illustrating an example system for mixing two digital signals of different formats using interpolation and conversion of the digital signals in the digital domain according to one embodiment of the disclosure.

An example block diagram for processing in an audio processor interpolating and/or converting differently formatted audio data into a single output, such as by performing the method of FIG. 5, is shown in FIG. 6. FIG. 6 is a block diagram illustrating an example system for mixing two digital signals of different formats using interpolation and conversion of the digital signals in the digital domain according to one embodiment of the disclosure. An audio processor 600 may include first inputs 602 and second inputs 604. The first inputs 602 may correspond to a first digital signal having a single-bit wide data format, such as DSD audio. The second inputs 604 may correspond to a second digital signal having a multi-bit wide data format. In some embodiments, the multi-bit wide data format may be used to carry single-bit wide data, such as with DoP (DSD over PCM). Data received from the first inputs 602 and 604 may be pre-processed in input circuitry 610, such as to decode and/or buffer data in the signals. The data may then be passed to a first data path in a DSD processor 612A or passed to a second data path in a PCM processor 612B.

The DSD processor 612A may include components for processing the single-bit wide data. For example, the single-bit wide data may be processed in a DSD comb filter 622, a SINC filter 624, a magnitude compensation filter 628, a high-pass filter (HPF) 630, and a volume control block 632. The DSD comb filter 622 may be configured to convert the single-bit wide data into a format, such as multi-bit wide data, that can be combined with the multi-bit wide data of the second data input 604. The DSD comb filter 622 may also or alternatively prepare the single-bit wide data for further processing involving addition or multiplication arithmetic, such as performed in the volume control block 632. In some embodiments such as the embodiment of FIG. 6, the DSD processor 612A may include no decimator block or otherwise decimate a DSD input signal.

The PCM processor 612B may include components for processing the multi-bit wide data. For example, the multi-bit wide data may be passed through a high-pass filter (HPF) 642, a volume control block 644, an interpolation filter 646, and a buffer 648. The interpolation filter 646 may convert an original frequency Fsi of a rate of the multi-bit wide data into a new rate, such as 8*Fsi. The buffer 648 may store the interpolated multi-bit wide data.

A mixer 614 may receive samples from the DSD processor 612A and the PCM processor 612B. The samples may be received at different rates. For example, the rate of samples from the DSD processor 612A may be 64*Fsi, while the rate of samples from the PCM processor 612B may be 8*Fsi. The mixer 614 may equalize the rate of samples received from the DSD processor 612A and the PCM processor 612B, such as by performing sample-and-hold or zero-order-hold on data received from the PCM processor 612B. An asynchronous sample rate converter (ASRC) may be coupled to the mixer 614 and may process the output of the mixer 614 and/or control sampling by the mixer 614 to match an output frequency that may be different from that of either input to the mixer 614. For example, an output from the ASRC may be 64*Fso, where Fso denotes a frequency of a clock different from the clock controlling operation of the audio processor 600. According to one embodiment, the ASRC may be coupled to a rate estimator (not shown) for providing the Fso frequency. The rate estimator may control when the mixer 614 samples data from the DSD processor 612A and the PCM processor 612B, such as to avoid over or under flow conditions.

Figure 7:
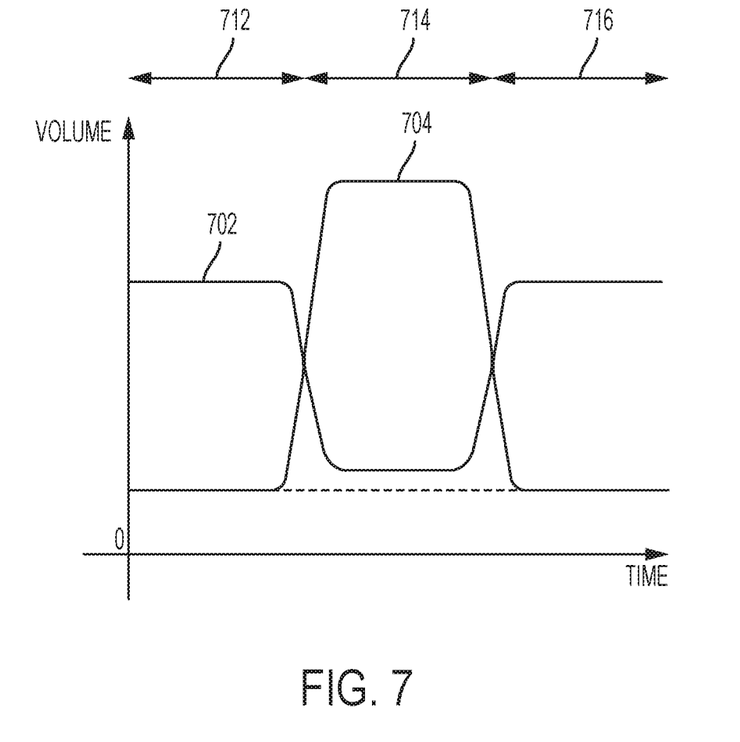
FIG. 7 is a graph illustrating an example of mixing of two digital signals to provide ducking of one digital signal during playback of a second digital signal by processing the digital signals in the digital domain according to one embodiment of the disclosure.

In one embodiment, volume control may be applied to each of the input signals to obtain a desired sound effect from the transducer. For example, ducking may be implemented by controlling the volume control for each input during which music playback may be reduced in volume to allow a notification sound to be heard. A graph showing one example control of volume control blocks 632 and 644 is shown in FIG. 7. FIG. 7 is a graph illustrating an example of mixing of two digital signals to provide ducking of one digital signal during playback of a second digital signal by processing the digital signals in the digital domain according to one embodiment of the disclosure. A graph 700 shows a line 702 corresponding to a volume control for playback of the first input signal, such as a high fidelity music file, and a line 704 corresponding to a volume control for playback of the second input signal, such as a lower fidelity notification sound. During a time 712, the music file is playing through the audio processor. During time 714, a notification sound is triggered for playback through the audio processor, such as when a mobile device containing the audio processors receives a notification of an incoming text message or voice call. The volume of the high fidelity music may be reduced and a volume of the notification sound increased to a value louder than the music. Although the notification volume of line 704 is shown exceeding an original volume of the music of line 702, the notification volume may be increased to any level higher than the music or any level that allows a user to hear the notification sound. The volume of the music file may be reduced to allow a user to notice the playback of the notification sound. After the notification sound has played, the volume of the notification sound may be decreased, such as back to zero. During a time 716, the high fidelity music file continues playback normally.

As described in embodiments of the invention above, an audio processor may process dissimilarly formatted digital audio signals and produce an analog output for reproduction by a transducer, such as a speaker. The audio processor may be, for example, a digital-to-analog converter (DAC) with multiple digital inputs and a single analog output. The audio processor may also include other components, such as processing components, filters, equalizers, amplifiers, and the like. The audio processor may process audio, such as high fidelity DSD audio and lower fidelity PCM audio, and combine the differently formatted data into a single output. During processing, the audio processor may manipulate the different audio signals, such as by ducking a music playback to allow a notification sound to be played.

The schematic flow chart diagrams of FIG. 3 and FIG. 4 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although analog-to-digital converters (ADCs) are described throughout the detailed description, aspects of the invention may be applied to the design of other converters, such as digital-to-analog converters (DACs) and digital-to-digital converters, or other circuitry and components based on delta-sigma modulation. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving a first signal comprising a one-bit wide data stream, wherein the one-bit wide data stream represents high-fidelity audio;

receiving a second signal comprising a multi-bit wide data stream, wherein the multi-bit wide data stream represents non-high-fidelity audio;

processing the first signal to obtain a processed first signal, wherein the step of processing the first signal comprises applying a digital volume control to the first signal; and mixing into a single output the one-bit wide data stream of the processed first signal with the multi-bit wide data stream of the second signal for simultaneous output of the first signal and the second signal to a digital-to-analog converter (DAC) for playback of the high-fidelity audio simultaneous with the non-high-fidelity audio.

2. The method of claim 1, further comprising:
processing the second signal in a second signal path before mixing the first signal with the second signal, wherein the second signal path processes a low-fidelity signal having a lower fidelity than the high-fidelity signal.

3. The method of claim 2, wherein the high-fidelity signal comprises direct stream digital (DSD) data, and wherein the low-fidelity signal comprises pulse coded modulation (PCM) data.

4. The method of claim 3, wherein the high-fidelity signal comprises music, wherein the low-fidelity signal comprises a notification sound, and wherein the step of mixing into a single output comprises producing in the single output a combination of the music and the notification sound.

5. The method of claim 4, wherein the step of producing the single output comprises ducking the music during playback of the notification sound.

6. The method of claim 1, wherein the step of mixing the one-bit wide data stream with the multi-bit wide data stream comprises updating samples from the one-bit wide data stream and the multi-bit wide data stream at different rates.

7. The method of claim 6, wherein the samples from the one-bit wide data stream and the multi-bit wide data stream are updated asynchronously.

8. The method of claim 6, wherein the one-bit wide data stream comprises data at a first data rate and the multi-bit wide data stream comprises data at a different second data rate.

9. The method of claim 1, wherein the step of mixing the one-bit wide data stream with the multi-bit wide data stream comprises interpolating the multi-bit wide data stream to a rate that is a ratiometric relation to a rate of the one-bit wide data stream.

10. The method of claim 1, wherein the step of mixing the one-bit wide data stream with the multi-bit wide data stream comprises converting the one-bit wide data stream to a second multi-bit wide data stream by filtering, and wherein the step of mixing comprises adjusting a volume of the second multi-bit wide data stream.

11. An apparatus, comprising:
a controller configured to perform steps comprising:
receiving a first signal comprising a one-bit wide data stream, wherein the one-bit wide data stream represents high-fidelity audio;
receiving a second signal comprising a multi-bit wide data stream, wherein the multi-bit wide data stream represents non-high-fidelity audio;
processing the first signal to obtain a processed first signal, wherein the step of processing the first signal comprises applying a digital volume control to the first signal; and
mixing into a single output the one-bit wide data stream of the processed first signal with the multi-bit wide data stream of the second signal for simultaneous output of the first signal and the second signal to a digital-to-analog converter (DAC) for playback of the high-fidelity audio simultaneous with the non-high-fidelity audio.

12. The apparatus of claim 11, wherein the controller is further configured to perform steps comprising:
processing the second signal in a second signal path before mixing the first signal with the second signal, wherein the second signal path processes a low-fidelity signal lower than the high-fidelity signal.

13. The apparatus of claim 12, wherein the high-fidelity signal comprises direct stream digital (DSD) data, and wherein the low-fidelity signal comprises pulse coded modulation (PCM), wherein the high-fidelity signal comprises music, wherein the low-fidelity signal comprises a notification sound, and wherein the step of mixing into a single output comprises producing in the single output a combination of the music and the notification sound.

14. The apparatus of claim 13, wherein the step of producing the single output comprises ducking the music during playback of the notification sound.

15. The apparatus of claim 11, wherein the step of mixing the one-bit wide data stream with the multi-bit wide data stream comprises updating samples from the one-bit wide data stream and the multi-bit wide data stream at different rates.

16. The apparatus of claim 15, wherein the samples from the one-bit wide data stream and the multi-bit wide data stream are updated asynchronously.

17. The apparatus of claim 15, wherein the one-bit wide data stream comprises data at a first data rate and the multi-bit wide data stream comprises data at a different second data rate.

18. An apparatus, comprising:
an audio processor, comprising:
a first input node configured to receive a first signal comprising a one-bit wide data stream, wherein the one-bit wide data stream represents high-fidelity audio;
a second input node configured to receive a second signal comprising a first multi-bit wide data stream, wherein the first multi-bit wide data stream represents non-high-fidelity audio;
a first signal path coupled between the first input node and a mixer, wherein the first signal path processes a high-fidelity signal by applying a digital volume control to the first signal to obtain a processed first signal;
a mixer configured to produce a single output combining the one-bit wide data stream of the processed first signal with the multi-bit wide data stream of the second signal for playback of the high-fidelity audio simultaneous with the non-high-fidelity audio; and
an output node configured to output the single output.

19. The apparatus of claim 18, further comprising:
a pulse width modulation (PWM) modulator coupled to the output node of the audio processor; and
a digital-to-analog converter (DAC) coupled to the pulse width modulation (PWM) modulator and configured to drive an amplifier for reproducing audio data in the first signal and the second signal at a transducer.

20. The apparatus of claim 18, wherein the audio processor further comprises:

a second signal path coupled between the second input node and the mixer, wherein the second signal path processes a low-fidelity signal having a fidelity lower than the high-fidelity signal.

21. The apparatus of claim 20, wherein the high-fidelity signal comprises direct stream digital (DSD) data, and wherein the low-fidelity signal comprises pulse coded modulation (PCM), wherein the high-fidelity signal comprises music, wherein the low-fidelity signal comprises a notification sound, and wherein the step of mixing into a single output comprises producing in the single output a combination of the music and the notification sound.

22. The apparatus of claim 21, wherein the mixer is configured to duck the music during playback of the notification sound.

23. The apparatus of claim 18, further comprising an asynchronous sample rate converter (ASRC) coupled to the mixer, wherein the asynchronous sample rate converter (ASRC) is configured to control the mixer to update samples from the one-bit wide data stream and the multi-bit wide data stream at different rates.

24. The apparatus of claim 23, wherein the asynchronous sample rate converter (ASRC) is configured to control the mixer to asynchronously update samples from the one-bit wide data stream and the multi-bit wide data stream.

\* \* \* \* \*

UNITED STATES PATENT AND TRADEMARK OFFICE
CERTIFICATE OF CORRECTION

| | |
|---|---|
| PATENT NO. | : 9,990,173 B2 |
| APPLICATION NO. | : 15/099277 |
| DATED | : June 5, 2018 |
| INVENTOR(S) | : Hester et al. |

It is certified that error appears in the above-identified patent and that said Letters Patent is hereby corrected as shown below:

On the Title Page

Item (72) Inventors, should read:
--Dyan Alexander Hester, Austin, TX (US);
Bala Vishnu Shankar Rao, Austin, TX (US);
Tarun Soni, Austin, TX (US);
John L. Mclanson, Austin, TX (US);
Tian Zhao, Austin, TX (US).--

Signed and Sealed this
Sixteenth Day of July, 2019

Andrei Iancu
*Director of the United States Patent and Trademark Office*